United States Patent
Farley et al.

(10) Patent No.: US 7,090,128 B2
(45) Date of Patent: Aug. 15, 2006

(54) MOBILE ELECTRONIC NEWSSTAND

(75) Inventors: Rodney J. Farley, Yorba Linda, CA (US); Joseph J. Renton, Orange, CA (US)

(73) Assignee: Systems and Software Enterprises, Inc., Anaheim, CA (US)

( * ) Notice: Subject to any disclaimer, the term of this patent is extended or adjusted under 35 U.S.C. 154(b) by 0 days.

(21) Appl. No.: 10/935,955

(22) Filed: Sep. 8, 2004

(65) Prior Publication Data

US 2005/0051615 A1     Mar. 10, 2005

Related U.S. Application Data

(60) Provisional application No. 60/501,220, filed on Sep. 8, 2003.

(51) Int. Cl.
*G07B 15/02*     (2006.01)

(52) U.S. Cl. .................. 235/384; 235/705; 235/51

(58) Field of Classification Search ........ 235/380–384; 455/557, 554, 431; 705/50–51, 57
See application file for complete search history.

(56) References Cited

U.S. PATENT DOCUMENTS

| | | | | |
|---|---|---|---|---|
| 5,739,746 A | * | 4/1998 | Shaffer et al. | 340/425.5 |
| 5,835,127 A | * | 11/1998 | Booth et al. | 725/76 |
| 5,862,321 A | * | 1/1999 | Lamming et al. | 709/200 |
| 5,959,596 A | * | 9/1999 | McCarten et al. | 345/2.1 |
| 5,973,722 A | * | 10/1999 | Wakai et al. | 725/76 |
| 6,047,127 A | * | 4/2000 | McCarten et al. | 717/173 |
| 6,072,476 A | * | 6/2000 | Harada et al. | 345/204 |
| 6,331,865 B1 | * | 12/2001 | Sachs et al. | 715/776 |
| 6,381,513 B1 | * | 4/2002 | Takase et al. | 700/231 |
| 6,741,841 B1 | * | 5/2004 | Mitchell | 455/188.1 |
| 6,754,642 B1 | * | 6/2004 | Tadayon et al. | 705/51 |
| 6,796,495 B1 | * | 9/2004 | Stahl et al. | 235/380 |
| 2002/0066393 A1 | * | 6/2002 | Strode et al. | 108/50.11 |
| 2002/0109647 A1 | * | 8/2002 | Crandall et al. | 345/2.1 |
| 2002/0165987 A1 | * | 11/2002 | Arisaka et al. | 709/246 |
| 2003/0023589 A1 | * | 1/2003 | Castle | 707/5 |
| 2003/0093798 A1 | * | 5/2003 | Rogerson | 725/75 |
| 2003/0110126 A1 | * | 6/2003 | Dunkeld et al. | 705/39 |
| 2003/0184957 A1 | * | 10/2003 | Stahl et al. | 361/680 |
| 2004/0054627 A1 | * | 3/2004 | Rutledge | 705/50 |
| 2005/0258238 A1 | * | 11/2005 | Chapman | 235/380 |

\* cited by examiner

*Primary Examiner*—Thien M. Le
*Assistant Examiner*—Edwyn Labaze

(57) ABSTRACT

Methods and apparatus for collecting documents that are electronic newspapers, magazines, and books into sets (one or more objects) and distributing them to passenger vehicles. Once distributed to the vehicles, individual documents of the document sets are distributed, possibly for a fee, to the passengers.

17 Claims, 2 Drawing Sheets

MOBILE ELECTRONIC NEWSSTAND

CROSS-REFERENCE TO RELATED APPLICATION

This application claims the benefit of Provisional Application No. 60/501,220, filed Sep. 8, 2003 and titled "Airborne Newspapers, Magazines and Books", herewith incorporated by reference in its entirety.

FIELD OF THE INVENTION

The present invention relates generally to electronic document delivery systems for delivering electronic documents to vehicles.

BACKGROUND OF THE INVENTION

Airlines have historically provided printed magazines and newspapers to passengers as a source of in-flight entertainment. However, repeated use of such products tends to cause them to degrade quickly. Moreover, such products are undesirably heavy and bulky, tend to be difficult to distribute, require collection after use, and are costly and time consuming to replace. Moreover, customer selection is typically limited. As such, there is a need, whether heretofore recognized or not, to provide a replacement for printed magazines and newspapers on airlines and other vehicles.

SUMMARY OF THE INVENTION

The present invention is directed to an apparatus including an onboard electronic document distribution system comprises one or more storage units comprising a machine readable medium that provides instructions to a set of processors. The instructions, when executed by the set of processors, cause the processors to perform operations comprising: (a) communicating to each of a plurality of passengers a plurality of options relating to documents to be viewed; accepting input from each passenger of the plurality of passengers as to what options the passenger has chosen wherein at least one chosen option identifies a document to be viewed by the passenger; and (c) displaying the identified document to the passenger while the passenger is seated in a seat of the vehicle. The present invention is also directed to related methods and apparatus, including distributions systems of which the onboard distribution system is a subsystem.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention. Moreover, the embodiments of the present invention described herein comprise multiple novel features with each described embodiment including either a single such feature or a combination of such features. Other contemplated embodiments include all combinations not explicitly described herein of one or more such novel features as such combinations are readily discernable from the embodiments described.

Described herein are methods and apparatus for collecting documents that are electronic newspapers, magazines, and books into non-empty sets and distributing them to passenger vehicles. Once distributed to the vehicles, individual documents of the document sets are distributed, possibly for a fee, to the passengers.

Figure 1:
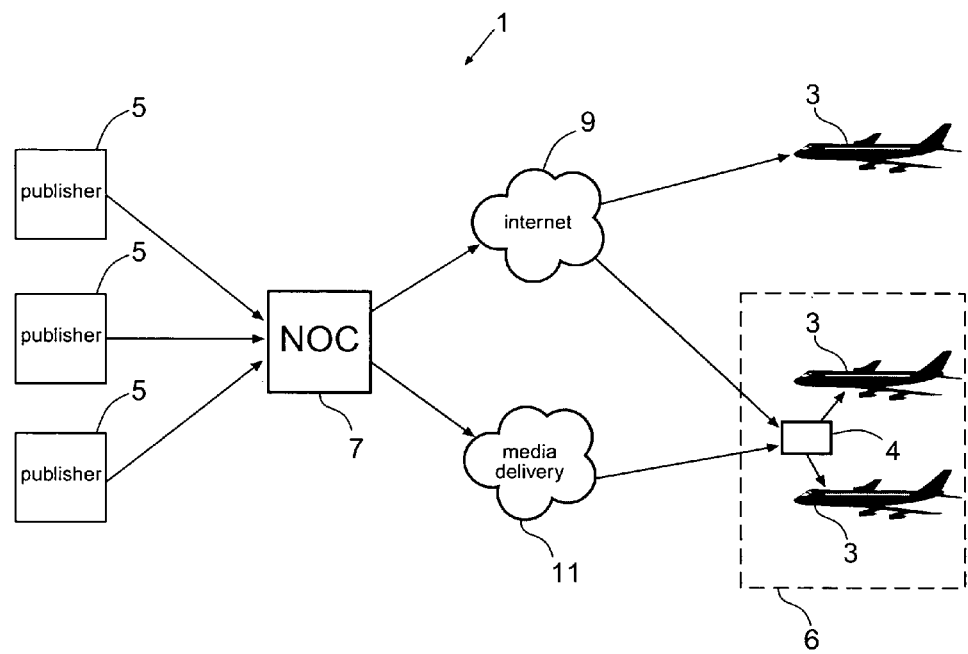
FIG. 1 depicts a document distribution system according to an instance of an embodiment of the claimed invention.

In FIG. 1, a document distribution system 1 is used for distributing document sets to a plurality of vehicles 3. In the embodiment of FIG. 1, system 1 comprises a plurality of document publishers 5, a network operations center 7, a network 9 such as the Internet permitting the network operations center to communicate with each of the plurality of vehicles 3, and a mechanism 11 for physical delivery of storage media to each of the plurality of vehicles 3. The network operations center 7 accepts documents from each of the plurality of publishers 5, and includes at least some of the documents in a set of data files and delivers the set of data files to at least some of the plurality of vehicles 3 via the network 9 or physical deliver mechanism 11. Delivery to vehicles may occur at any time, including times when a vehicle is in operation. As such, for an aircraft, delivery may occur at least while it is in flight, while it is in between flights, and/or while it is be serviced.

The vehicles 3 are shown in FIG. 1 as aircraft, but may be any form of vehicle including but not limited to automobiles, trains, trucks, ships, and spacecraft. However, it is contemplated that the system 1 can be particularly advantageous when vehicles 3 are large multi-passenger vehicles. Although delivery is shown as being directly to the vehicles, in some instances delivery may be made to one or more carriers 6 operating the vehicles with the carriers handling delivery to the vehicles. In FIG. 1, NOC 7 can be seen to communicate with a carrier distribution center 4 via network 9 and mechanism 11. Center 4 then forwards data file sets to vehicles 3 that belong to carrier 6. It is also contemplated that delivery may be made to one or more entities other than carriers 6 where such entities are responsible for delivery of data file sets to vehicles 3 or carriers 6.

The network operations center (NOC) 7 may in some instances actually comprise a plurality of facilities, possibly located at different geographic locations. However, it is contemplated that in some instances it will be advantageous to have the NOC 7 consist of a single facility at a particular location. It is also contemplated that it may be advantageous for the NOC 7 to comprise the one or more of the following features and/or have one or more of the following capabilities: (a) accept documents in a native electronic format; (b) convert documents to a common format specifically designed for a vehicle, (c) create and append control parameters specific to each electronic document; (d) control and distribute access rights for each document; and (e) initiate and monitor distribution of electronic documents to a vehicle.

As used herein, the term "publisher" includes any provider of electronic documents (e-documents) such as electronic magazines, books, or newspapers to the network operations center. As such, in some instances the publisher may be a distributor, courier, or some other entity rather than the ultimate source of the documents. The publishers 5 may provide documents to the NOC 7 in any manner. As such, in some instances documents may be transmitted via a network such as the Internet. In other instances, the publishers 5 may deliver CDs, DVDs, or other storage media containing documents to the publisher. In still other instances, the publishers 5 may utilize some other communication means such as radio, microwave, or fiber optic link to provide documents to the NOC 7. However, it is contemplated that it may be particularly advantageous to have publishers repurpose their content specifically for usage by mobile vehicles, to distribute their documents ahead of normal publishing timelines for added value to their readers, compress their content to reduce the cost of electronic distribution, and/or to encrypt their content to avoid compromise.

Documents provided to the NOC 7 may, and likely will, be provided in a variety of formats, some of which may involve encryption and or compression of the documents. In some instances individual documents may be provided while in others sets of documents may be provided. However, it may in some instances be advantageous if some or all documents provided by publishers were provide in a common format, or a limited number of common formats. As an example, documents might be provided as PDF files. Similarly, the NOC 7 may distribute sets of one or more documents (e-document database) in a variety of formats, some of which may involve encryption and or compression. However, it is contemplated that the use of a proprietary format may be particularly advantageous as it can, among other functions, support carrier and customer options, protect the contents of the document sets, and facilitate delivery to vehicles and or carriers It is contemplated that in some cases, raster images of the documents in varying levels of magnification may be distributed due to limited capabilities of particular vehicles. In other cases documentation distribution may be controlled and limited based on the route or destination of the vehicle. In still other cases, documents may be transformed for purposes of distribution and then restored to a readable format once loaded on the vehicle.

As with delivery of documents from the publishers 5 to the NOC 7, delivery of document sets from the NOC 7 to the vehicles 3 may be performed in any manner. As such, in some instances document sets may be transmitted via a network such as the Internet. In other instances, the NOC 7 may deliver CDs, DVDs, or other storage media containing document sets to the vehicles 3. In still other instances, the NOC 7 may utilize some other communication means such as radio, microwave, or fiber optic link to provide document sets to the NOC 7. However, it is contemplated that it may be particularly advantageous to have documents sets including non-time critical documents delivered via CDs, DVDs, or similar storage media, and document sets of time critical documents via electronic communications, possibly via the Internet. As mentioned previously, in some instances delivery of document sets from NOC 7 to the vehicles 3 may involve deliver to an intermediary such as a carrier operating the vehicles 3 that will handle final distribution to at least some of the vehicles 3.

As used herein, time critical documents include any document that customers prefer to read shortly after publication. As such, newspapers would likely be considered time-critical, and, to a lesser extent, magazines may be as well. Books are an example of documents that would generally not be considered time critical.

Figure 2:
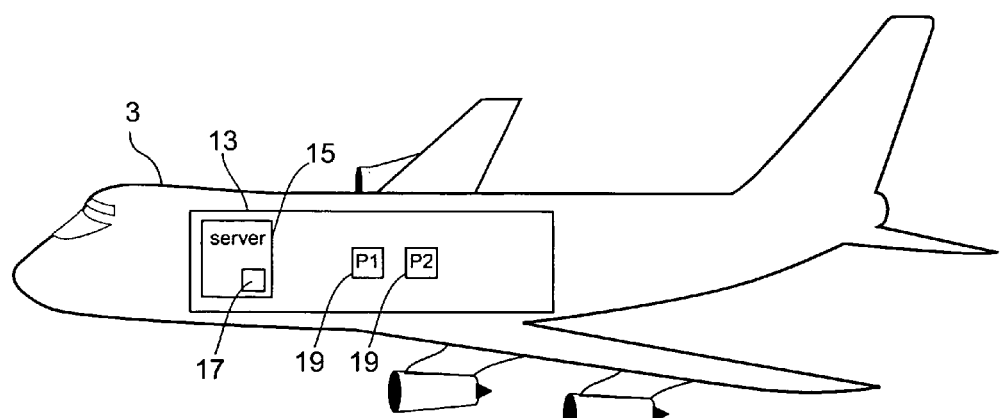
FIG. 2 depicts an onboard distribution system that is a subsystem of the distribution system of FIG. 1.

Once delivered to a vehicle, a document set is stored for later distribution to customers who are passengers on the vehicle. As such, the distribution system 1 includes a plurality of sub-systems that comprise onboard distribution systems such as onboard distribution system 13 of FIG. 2. In FIG. 2, onboard document distribution system 13 comprises one or more storage units 15 comprising at least one machine readable medium that provides instructions, which when executed by a set of processors 17, cause the set of processors 17 to perform operations comprising: (a) communicating to each of a plurality of passengers 19 a plurality of options relating to documents to be viewed; (b) accepting input from each passenger of the plurality of passengers as to what options the passenger has chosen wherein at least one chosen option identifies a document to be viewed by the passenger; (c) displaying the identified document to the passenger while the passenger is seated in a seat of the vehicle.

As used herein, a machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; and electrical, optical, acoustical or other form of propagated signals (e.g., carrier waves, infrared signals, digital signals, etc.).

It is contemplated that the one or more storage units 15 may in some embodiments comprise a single unit, and or may function as a file server that both stores and controls access to the document sets delivered to the aircraft.

The options communicated to the passengers 19 will typically comprise at least the option of which document is to be viewed. It is contemplated that in some instances documents available to a passenger may be limited to a subset of the documents stored in the one or more storage units 15. Such limitations may be based on criteria such as the passenger's seat location; the type of content requested; and the method of displaying identified documents to the passenger. Limitations based on passenger seat location allows for delivery of different content to different seat classes, such as first class, business class and coach seats. Limitations based on type of content may distinguish between magazines, books, and newspapers, by categories such as fiction, non-fiction, mystery, romance, and western, or by some other type differences.

The options communicated to the passengers may also include one or more of the following: display resolution, magnification level, touch screen or cursor navigation, full screen or partial screen display, page layout, with or without associated audio, and color or black and white.

It is contemplated that both option selection and document viewing may be accomplished in a number of ways. As such, the devices used to specify options and or to view documents may include but are not necessarily limited to the use of lap-top computers electronic personal data assistants (PDAs), digital media players, digital audio players, in-seat displays associated with aircraft In-flight Entertainment Systems, and built in viewers.

Two contemplated input devices for accepting input from passengers are digital keyboards and credit card readers which may, in some instances be combined into a single device provided to a passenger. It is contemplated that a digital keyboard will provide a large degree of flexibility as to what a passenger can input, while a credit card reader allows a passenger to pay for products or services while remaining seated.

Although in some instances option selection and document viewing may be accomplished using generic hardware and software, it is contemplated that viewing of documents may be advantageously performed using a proprietary reader. In some instances such a reader may consist essentially of software on a passenger's computer or PDA, while in others it may comprise both hardware and software that is provided to a passenger while traveling.

It is contemplated that such a proprietary reader would: (a) allow easy navigation to document pages and sections; (b) possess considerations for viewer's eyesight differences; (c) possess features to facilitate reading in varying levels of ambient light; (e) have all inputs mapped specifically to the electro-mechanical features available on the reader (e.g, touch screen, cursor, 4-way navigation button, voice recognition, credit card reader); (f) map to the size of the viewable space on the vehicle display; and/or (g) possesses considerations to the placement of the reader within the vehicle and/or features of reader (I/O mechanisms, screen designs, etc.)

The methods and apparatus described herein support a number of business models. In one such, a carrier provides documents to passengers without charging any additional fees as a way to encourage people to purchase tickets on the carrier's vehicles. In some instances, different options may be available to different seat classes to encourage passenger to upgrade their seats. In another model, a carrier can rent I/O devices to passengers or a subset of passengers. In another model, a carrier may provide an I/O device free of charge, but charge for each document viewed. In yet another model, a carrier may charge for both renting the device, and for content viewed. It is also contemplated that the NOC operator may utilize some or all of the methods and apparatus described herein for revenue generation, as might the publishers, and any vendors renting or selling readers. As an example, the NOC operator might charge both for content delivered and for providing proprietary readers.

Figure 3:
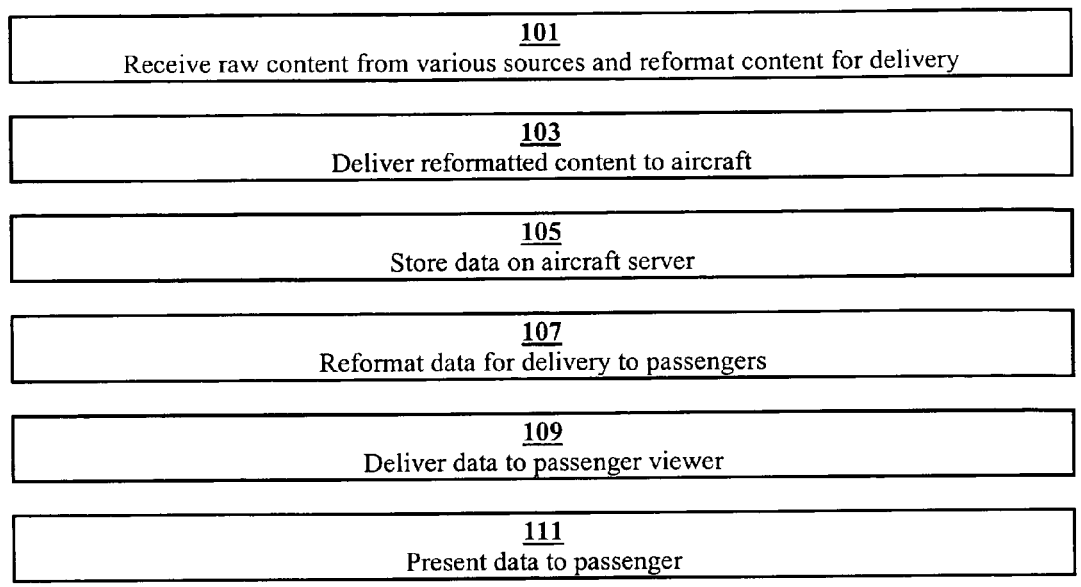
FIG. 3 is a schematic view of a method according to an instance of an embodiment of the claimed invention

As illustrated by FIG. 3, in addition to the methods specifically described and/or inherent in the preceding description, it is contemplated that in some instances a method of distributing documents to passengers of multi-passenger vehicles may comprise one or more of the following steps: step 101, receive raw content from various sources and reformat content for delivery; step 103, deliver reformatted content to aircraft; step 105, store data on aircraft server; step 107, reformat data for delivery to passengers; step 109, deliver data to passenger viewer; and step 111 present data to a passenger. In some instances, the following descriptions may be applicable to the steps. In step 101 the raw content in encrypted into a proprietary format suitable for delivery to an aircraft. This preparation may include the creation of metadata associated with each content item. In step 103, the encrypted and compressed content, along with any content metadata, is delivered to an aircraft. In step 105, the delivered content and any metadata are stored on an aircraft server. In step 107, the content is decrypted and decompressed and, based on any metadata, converted into a native view format, which includes different viewing resolutions. In step 109, the content is delivered to passengers for viewing, preferably while they remain in their seats. In step 111, at each passenger location where a passenger using the system is seated, the content is displayed in a custom proprietary reader. Different levels of page magnification allows for easier page navigation and readability.

What is claimed is:

1. A document distribution system wherein documents are sent to one or more passenger vehicles, each vehicle including an onboard electronic document distribution system having one or more storage units, a plurality of keyboards with at least one of the plurality of keyboards being a credit card reader, the document distribution system comprising:
  at least one processor that performs the following operations:
  communicates to each of a plurality of passengers, a plurality of options relating to documents to be viewed;
  accepts input from each passenger as to what options the passenger has chosen, wherein at least one chosen option identifies a document to be viewed by the passenger; and
  displays the identified document to the passenger while the passenger is in a seat of the vehicle;
  a plurality of document publishers;
  a network operations center that accepts documents in electronic format, converts documents to a common data file format specifically designated for one or more of the passenger vehicles, creates and appends control parameter specifications to each electronic document, which controls access rights for each document, and initiates and monitors distribution of electronic documents to one or more passenger vehicles;
  a communication network permitting the network operations center to communicate with each of the one or more vehicles; and
  a mechanism for physical delivery of storage medium to each of the one or more vehicles,
  wherein the network operations center accepts documents from each of the plurality of publishers and includes at least some of the documents in a set of data files and delivers the set of data files to at least one of the one or more vehicles by way of the network or by physical delivery of storage media.

2. The document distribution system of claim 1 wherein the onboard system communicates different sets of options to different passengers wherein the set of options provided to a particular passenger is selected at least in part on one or more of the following: the passenger's seat location; the type of content requested; and the method of displaying identified documents to the passenger.

3. The document distribution system of claim 1 wherein at least one of the plurality of document publishers:
  adapts material that it publishes via printed magazines or newspapers specifically for usage by mobile vehicles;
  provides the adapted material to the network operations center sooner than such material is provided to the public via printed magazines or newspapers;
  compresses the adapted content to reduce the cost of electronic distribution; and
  encrypts the adapted material prior to providing the material to the network operations center.

4. The document distribution system of claim 1 wherein a data file includes a plurality of raster images corresponding to a single document with at least some of the plurality of raster images having a different level of magnification than other of the plurality of raster images.

5. A method of distributing documents to passengers in a multi-passenger vehicle comprising the steps:
communicating to each one of a plurality of passengers, a plurality of options relating to documents to be viewed;
accepting input from each passenger as to what options the passenger has chosen wherein at least one chosen option identifies a document to be viewed by the passenger;
receiving documents from a plurality of services and reformatting the received documents including preparing metadata associated with each document and encrypting and compressing the content into a format suitable for delivery to a vehicle;
delivering the reformatted documents to the multi-passenger vehicle;
storing the reformatted documents on a server on the multi-passenger vehicle;
delivering the documents chosen by a passenger for viewing, to a passenger viewer; and
displaying the delivered document to the passenger while the passenger is in a seat of the vehicle at a level of magnification selected by the passenger.

6. The method of claim 5 wherein a system onboard each of the multi-passenger vehicles communicates different sets of options to different passengers, wherein the set of options provided to a particular passenger is selected at least in part on one or more of the following: the passenger's seat location; the type of content requested; and the method of displaying identified documents to the passenger.

7. The method of claim 5 where the step of delivering the reformatted content comprises electronically transferring data to the vehicle or delivering storage media to the vehicle.

8. The method of claim 5 where the step of storing the reformatted content comprises storing the reformatted content on a machine readable medium.

9. The method of claim 5 further comprising the step of decrypting and decompressing the content and, based on the metadata associated with the content, converting the content into a view format which includes different viewing resolutions for at least some of the documents of the converted content.

10. The method of claim 5 where the step of delivering reformatted content to a passenger viewer comprises wirelessly transmitting the reformatted content.

11. An e-document system for producing an e-document database for use on transport vehicles, the system comprising:

a plurality of publishers; and
a network operations center that accepts e-documents from the plurality of publishers further including:
a data converter for converting e-documents from a publisher's native format to a vehicle specific format;
a metadata generator for appending control parameter and distribution right information to e-documents;
a data base generator that assembles e-documents into the e-document database; and
a means for delivering the e-document data base to a transport vehicle.

12. The system of claim 11 wherein the transport vehicle includes:
a data storage device;
a data device connected with the data storage device that processes payment information;
a plurality of viewing devices for viewing e-documents in the e-document data base.

13. The system of claim 12 wherein at least one of the e-documents is proprietary.

14. The system of claim 12 wherein at least one of the e-documents is a copyrightable work subject to a royalty.

15. An E-publishing system comprising:
a plurality of publishers that distribute proprietary e-documents;
a data processing facility that accepts the e-documents from the plurality of publishers including:
a formatting unit that converts the native format documents to vehicle specific data formats;
a republishing unit that appends e-document specific metadata to the e-document;
a distribution means for distributing e-documents to a plurality of transport vehicles; and
a plurality of transport vehicles that receive the e-documents from the data processing facility further including;
a data storage means for storing the e-documents;
a payment means for purchasing the document stored on the e-storage means; and
a display for displaying the e-document.

16. The e-publishing system of claim 15 wherein at least one of the e-documents is a copyright protected work.

17. The e-publishing system of claim 16 wherein the document is subject to a royalty when distributed.

* * * * *